US 6,640,820 B2

(12) United States Patent
Caldwell et al.

(10) Patent No.: US 6,640,820 B2
(45) Date of Patent: Nov. 4, 2003

(54) SELF-SERVICE COIN-OPERATED MANUAL CAR WASH STATION WITH INTEGRATED EXIT AIR DRYING APPARATUS

(76) Inventors: Russell L. Caldwell, P.O. Box 98, Garden Prairie, IL (US) 61038; Charles L. Caldwell, P.O. Box 98, Garden Prairie, IL (US) 61038

( * ) Notice: Subject to any disclaimer, the term of this patent is extended or adjusted under 35 U.S.C. 154(b) by 23 days.

(21) Appl. No.: 09/915,652

(22) Filed: Jul. 26, 2001

(65) Prior Publication Data

US 2002/0046758 A1 Apr. 25, 2002

Related U.S. Application Data

(60) Provisional application No. 60/220,858, filed on Jul. 26, 2000.

(51) Int. Cl.[7] .................................................. B08B 3/02
(52) U.S. Cl. ..................... 134/95.1; 134/95.3; 134/99.1; 134/123
(58) Field of Search .............................. 134/56 R, 57 R, 134/58 R, 45, 94.1, 95.1, 95.3, 98.1, 99.1, 123; 15/DIG. 2

(56) References Cited

U.S. PATENT DOCUMENTS

| 1,628,317 A | * | 5/1927 | Hoevel ........................ 134/123 |
| 1,970,674 A | * | 8/1934 | Seibert et al. ............. 15/DIG. 2 |
| 3,229,703 A | * | 1/1966 | Thompson et al. ......... 134/123 |
| 3,451,094 A | * | 6/1969 | Kywi ......................... 134/123 |
| 3,787,986 A | | 1/1974 | Burger |
| 3,994,041 A | | 11/1976 | Barber |
| 4,020,857 A | | 5/1977 | Rendemonti |
| 4,123,004 A | | 10/1978 | Jerry |
| 4,288,255 A | * | 9/1981 | Burger ..................... 15/DIG. 2 |
| 4,413,785 A | | 11/1983 | Engelbert et al. |
| 4,559,721 A | | 12/1985 | Hanna |
| 4,561,193 A | | 12/1985 | Burger |
| 4,563,788 A | | 1/1986 | Kobayashi |
| 4,651,442 A | | 3/1987 | McIntyre |
| 4,817,301 A | | 4/1989 | Belanger et al. |
| 4,836,467 A | | 6/1989 | Rodgers |
| 4,848,384 A | * | 7/1989 | Christopher et al. ........ 134/123 |
| 4,867,798 A | * | 9/1989 | Weikmann .................. 134/123 |
| 4,872,238 A | | 10/1989 | Crotts et al. |
| 4,933,016 A | | 6/1990 | Carlson |
| 4,979,316 A | | 12/1990 | Belanger |
| 4,991,316 A | | 2/1991 | Crotts |
| 5,033,489 A | | 7/1991 | Ferre et al. |
| 5,098,023 A | | 3/1992 | Burke |
| 5,110,049 A | * | 5/1992 | Harris et al. ............... 134/123 |
| 5,187,881 A | | 2/1993 | McElroy |
| 5,367,739 A | | 11/1994 | Johnson |
| 5,421,102 A | | 6/1995 | McElroy et al. |
| 5,535,475 A | | 7/1996 | Sauter |
| 5,875,565 A | | 3/1999 | Bowman |
| 5,950,331 A | | 9/1999 | Coggins et al. |
| 6,021,584 A | | 2/2000 | Schwartz |
| 6,135,363 A | * | 10/2000 | Tizer .......................... 134/123 |
| 6,286,228 B1 | * | 9/2001 | Bodnar et al. .............. 134/123 |

FOREIGN PATENT DOCUMENTS

| JP | 63-270266 | * 11/1988 |
| JP | 1-190565 | * 7/1989 |
| NL | 8901454 | * 1/1991 |

* cited by examiner

Primary Examiner—Frankie L. Stinson
(74) Attorney, Agent, or Firm—Keith Frantz

(57) ABSTRACT

A self-service car wash provided with coin-operated time-controlled wash and rinse spray capability includes an integrated exit air drying apparatus controlled by the coin-operated controller.

11 Claims, 3 Drawing Sheets

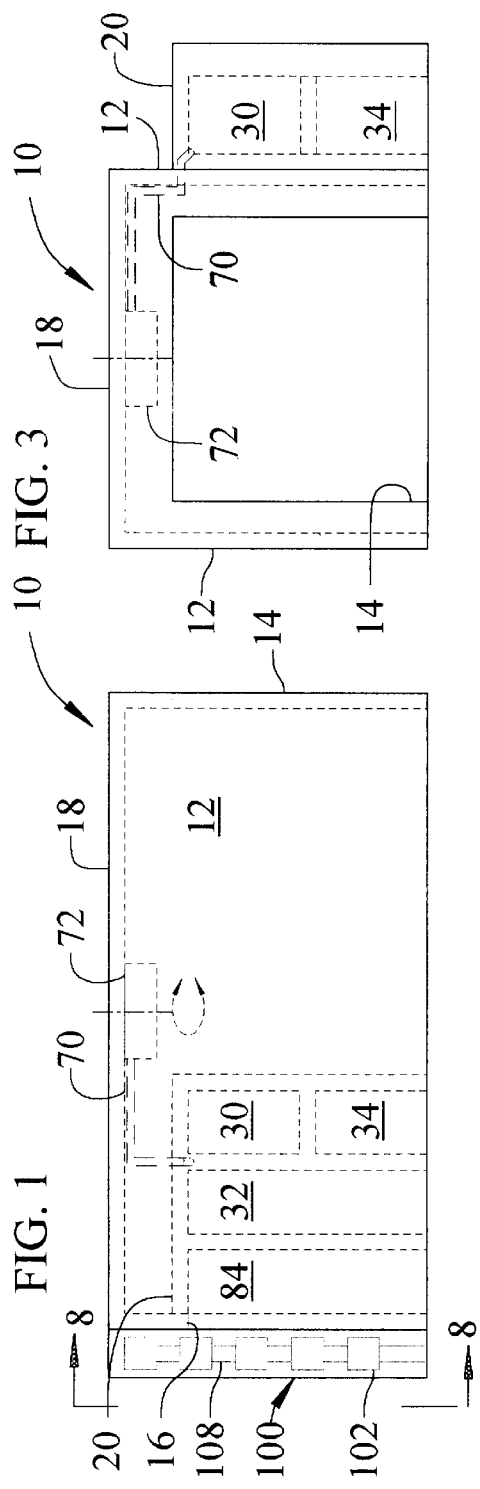
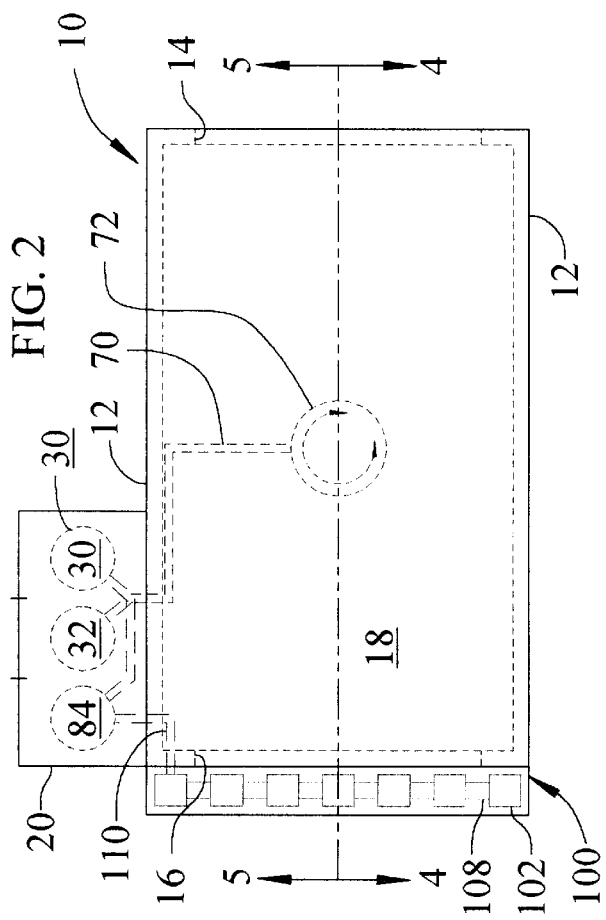

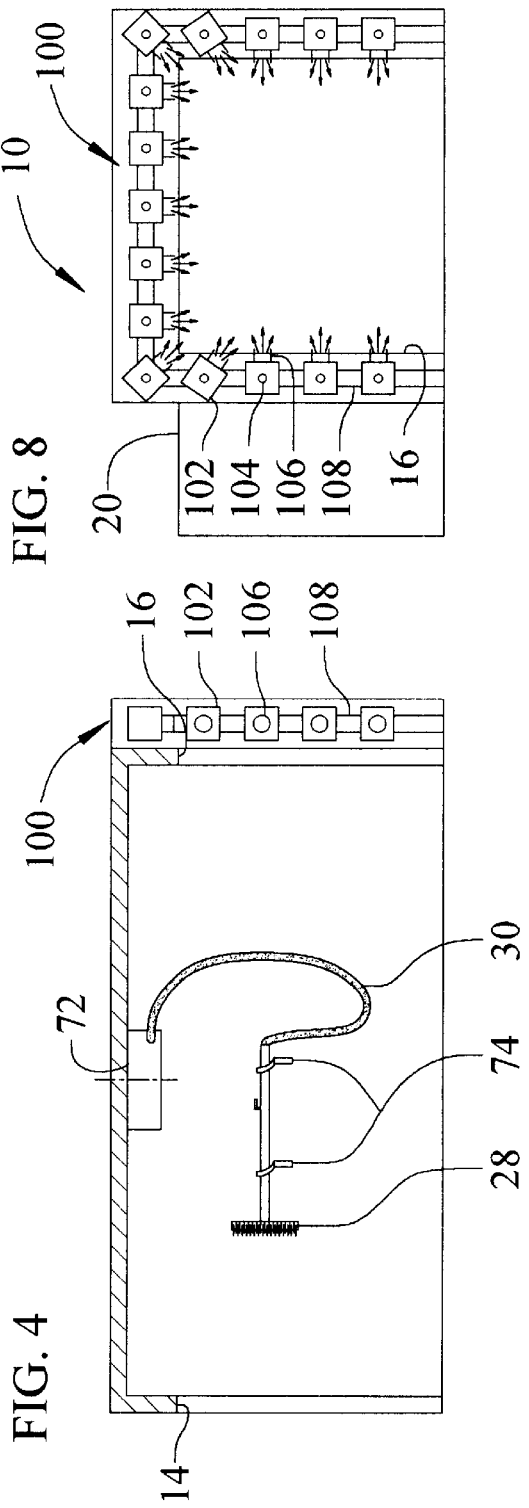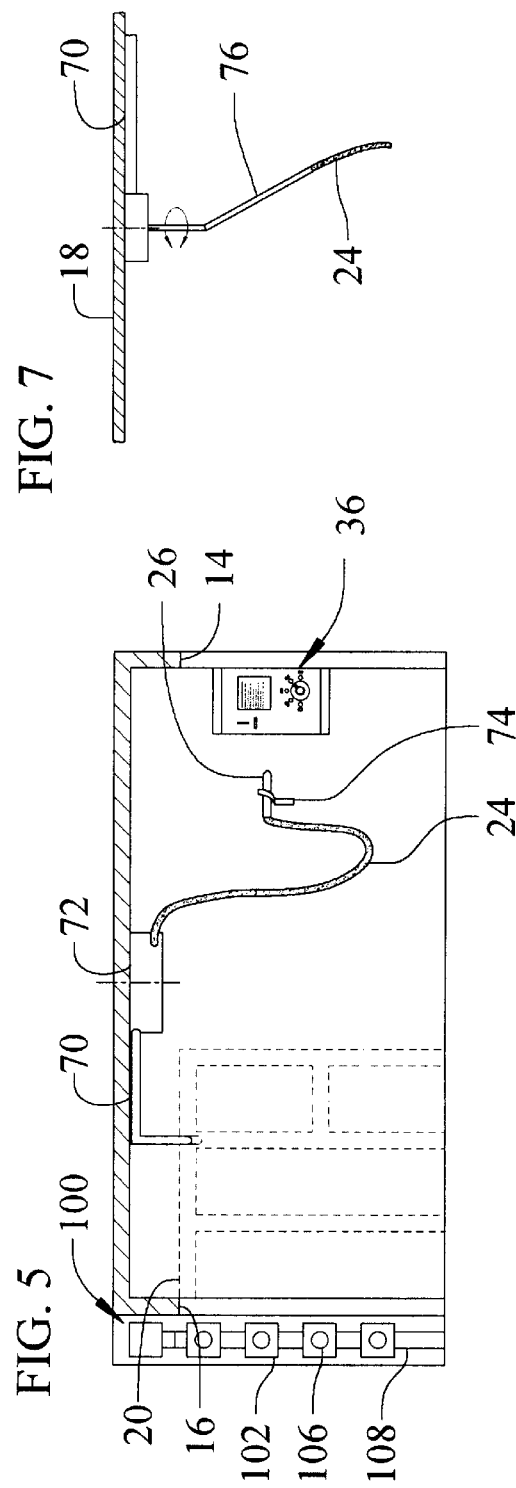

SELF-SERVICE COIN-OPERATED MANUAL CAR WASH STATION WITH INTEGRATED EXIT AIR DRYING APPARATUS

CROSS-REFERENCES TO RELATED APPLICATIONS

This application claims the benefit of U.S. Provisional Patent Application Ser. No. 60/220,858 filed Jul. 26, 2000.

REFERENCE TO MICROFICHE APPENDIX not applicable.

STATEMENT REGARDING FEDERALLY SPONSORED RESEARCH OR DEVELOPMENT not applicable.

BACKGROUND OF THE INVENTION

1. Field of Invention

The present invention relates generally to self-service, coin-operated, manual car wash stations.

More particularly, the invention relates to such car wash stations equipped with integrated or built-in exit apparatus for drying of vehicles with a drying air flow immediately after washing has been completed.

2. Description of Prior Art

A conventional self-service coin-operated manual car wash station is typically equipped with a flexible pressure hose and associated manually operable spray wand or trigger actuated nozzle for spraying clean and soapy water to pre-soak, wash and rinse the vehicle. Such car wash stations may also be equipped with apparatus for spraying liquid wax through said nozzle or a separate nozzle, and a brush to which soapy suds are supplied for scrubbing the vehicle. A coin-operated control box controls delivery of the water, soap and wax to the appropriate nozzle or brush based on a selection made by the user and for a predetermined time based on the amount of money deposited into the control box.

Conventional prior self-service coin-operated manual car wash stations are typically designed and built to meet several common desirable attributes and characteristics that make them suitable for use by the causal or occasional user, while maintaining them as financially viable commercial business establishments. These desirable attributes and characteristics include:

the cleaning apparatus, i.e., the brushes and spray nozzle, and associated hoses, are relatively lightweight, easily maneuverable, simple to operate, and share a commonality of obvious or self-explanatory operation, the cleaning apparatus are controlled by a coin-receiving control box that is also simple to operate, and designed for obvious or self-explanatory operation including necessary instructions and indicia, such that the car wash station is a cash generating business without the need to be permanently staffed, the coin-operated controller is adapted for mutually exclusive selection of one of the alternate operating modes of rinsing, washing and waxing such that no two operating modes can be inadvertently selected or operating simultaneously—accordingly, if, for example, coins are deposited for fifteen minutes of spray operating time and only five minutes is used for the initial pre-soak, ten minutes of operating time will be left available for spray washing and rinsing, and the operating equipment, including pumps, supply tanks, flow control valves, etc. is secured in an equipment room or in an otherwise out-of-reach location to prevent tampering by unauthorized personnel.

In short, it is desirable that self-service coin-operated car wash stations be easy to use by the casual user without the need for assistance or oversight of an attendant or presence of other personnel.

In order to maintain suitability for the casual user, is it desirable that any improvement for self-service, coin-operated manual car wash stations include and build upon these characteristics. Unfortunately, drying of washed vehicles is an area that has not been successfully or adequately addressed in the prior art with regard to such manual car wash stations while keeping within the above-mentioned desired characteristics.

In order to avoid unsightly water spots, the conventional procedure used with coin-operated, self-service manual car wash stations is to towel dry the vehicle immediately after washing or waxing has been completed. However, this conventional procedure presents several difficulties, including:

The user must either remember to bring towels to the car wash station, or use paper towels provided at the car wash station.

If cloth towels are used, they must then be carried back home for cleaning.

The use of paper towels is generally not desirable because, among other things, they tend to shred while being used and contribute to unnecessary waste because of the large number of towels needed to dry an entire vehicle.

Manual towel drying is a time-consuming operation. As a result, towel drying of the vehicle may not be thoroughly completed, often times because parts of the vehicle air dry prior to drying such areas with the towel.

In addition, towel drying can be harmful to the finish of the vehicle. For a few users extremely concerned about the finish of their vehicle, one of the attractive features of a manual car wash is that scrub brushes and other apparatus that may contact the vehicle in an automatic car wash are avoided in a manual car wash. For those individuals, towel drying tends to defeat this otherwise attractive aspect of manual car washing. And for this reason, those individuals tend to use specialized materials for drying their vehicles. However, such materials are relatively expensive, and must be carried to and from the car wash facility.

Investigation of the prior art reveals numerous adaptations and modifications related to manual car washing. However, none provide suitable alternate drying arrangement within the above-mentioned desired attributes and characteristics of the self-service, coin-operated manual car wash station.

Burger, U.S. Pat. No. 3,787,986 discloses a blower arrangement adapted to develop a desired specific air-flow characteristic for drying freshly washed vehicles. Although possibly suitable for use in a stationary position in an automated car wash as contemplated in certain embodiments, the dryer arrangement of Burger is rather large and bulky, and is not suitable for use by the casual user of a typical self-service coin-operated manual car wash facility. In particular, the large exposed air flow cavities and exposed rear inlet through which air is drawn is located precisely where the user would be standing if manually pointing the dryer at the vehicle, creating a genuine and substantial hazard to both the user and the equipment.

Coggins et al, U.S. Pat. No. 5,950,331 discloses a self-contained coin-operated compressed air vehicle drying system adapted to be used at a pre-existing car wash station such as either being secured to a wall or provided free-standing. Unfortunately, such an arrangement does not fit within or promote those recognized desired characteristics of self-service coin-operated manual car wash stations discussed above. Specifically, the Coggins apparatus is susceptible to tampering or damage as a result of being intentionally placed in the open. And since the dryer is on an independent, separately controlled coin-operated timer, the dryer may be operated simultaneously with another of the conventional spray functions, resulting in possible confusion of the user, and resulting in at least the possibility of additional/unnecessary expense to the user if additional spray time remains with the conventional coin-operated liquid spray control box when the drying air spray is needed.

Schwartz, U.S. Pat. No. 6,021,584 discloses an attachment for an air blower that is adapted to produce a sheet of high-velocity drying air for drying vehicles. This attachment is suitable for use in a non-commercial environment such as at the user's home, but includes no provision for timed operation or manual flow control, and therefore is generally not suitable for use in a commercial self-service coin-operated car wash station.

Ferre et al U.S. Pat. No. 5,033,489 discloses a self-contained manual vehicle washing center suitable for use by trained personnel, but not suitable for use by the casual user of coin-operated car wash stations.

Additional prior art directed toward automatic car wash facilities, including several drying arrangements suitable for use therewith, include: Kobayashi, U.S. Pat. No. 4,563,788 (a top drying nozzle device and associated link mechanism for controlled movement of the nozzle); Belanger, U.S. Pat. No. 4,979,316 (a free-standing portable booster dryer for automatic car wash line, but not suitable for the desired unattended operation of a coin-operated manual car wash station); Burke U.S. Pat. No. 5,098,023 (an apparatus for semi-automated car washing comprising a multi-purpose arch or a series of arches adapted to automate certain steps during washing of a vehicle); Barber U.S. Pat. No. 3,994,041; Rendemonti U.S. Pat. No. 4,020,857; Hanna, U.S. Pat. No. 4,559,721; Burger U.S. Pat. No. 4,561,193; McIntyre, U.S. Pat. No. 4,651,442; Belanger et al. U.S. Pat. No. 4,817,301; Rodgers U.S. Pat. No. 4,836,467; Crotts et al. U.S. Pat. No. 4,872,238; Carlson, U.S. Pat. No. 4,933,016; Crotts U.S. Pat. No. 4,991,316; McElroy, U.S. Pat. No. 5,187,881; Johnson U.S. Pat. No. 5,367,739; McElroy et al. U.S. Pat. No. 5,421,102; Sauter U.S. Pat. No. 5,535,475; and Bowman, U.S. Pat. No. 5,875,565.

In summary, while it is well recognized that it is desirable to thoroughly dry a washed car as quickly as possible immediately after completion of the washing thereof to avoid unsightly water-spots, no such exit drying arrangement is known or available for use in commercial-type self-service coin-operated manual car wash stations.

Thus, there is a need for a manually operable drying system for use with such manual car wash stations in keeping with the above-mentioned desired attributes and characteristics, that eliminates the difficulties and undesirable characteristics of conventional towel drying and prior apparatus, and that includes integrated ease of operation by the occasional user and protection of the associated equipment.

SUMMARY OF THE INVENTION

The general aim of the present invention is to provide new and improved self-service coin-operated manual car wash stations including integrated provision for automatic exit drying of cleaned vehicles so as to eliminate the need to towel dry the vehicle to prevent water spots.

A detailed objective of the invention is to achieve the foregoing by providing self-service coin-operated manual car wash stations including integrated coin-operated time-controlled air supply apparatus providing for a drying supply to dry the washed vehicle as it exits the wash bay.

A more detailed objective of the invention is to provide such air drying apparatus comprising a high-volume forced-air blower/dryer arrangement that is integrated into the exit of the washing station and controlled by the coin-operated timing controller of the conventional water and soap spray wand of such car wash stations.

These and other objectives and advantages of the invention will become more apparent from the following detailed description when taken in conjunction with the accompanying drawings.

BRIEF DESCRIPTION OF THE DRAWINGS

FIG. 1 is a side view of a manual car wash station incorporating the unique aspects of the present invention.

FIGS. 2 and 3 are top and entrance end views, respectively of the car wash station of FIG. 1.

FIGS. 4 and 5 are inside views of the side walls of the manual car wash station taken substantially along lines 4—4 and 5—5, respectively, of FIG. 2.

FIG. 7 is a fragmentary side view of an alternate arrangement for certain parts shown in FIGS. 4 and 5.

FIG. 8 is an end view taken substantially along the line 8—8 of FIG. 1, and showing the exit end thereof.

Figure 6:
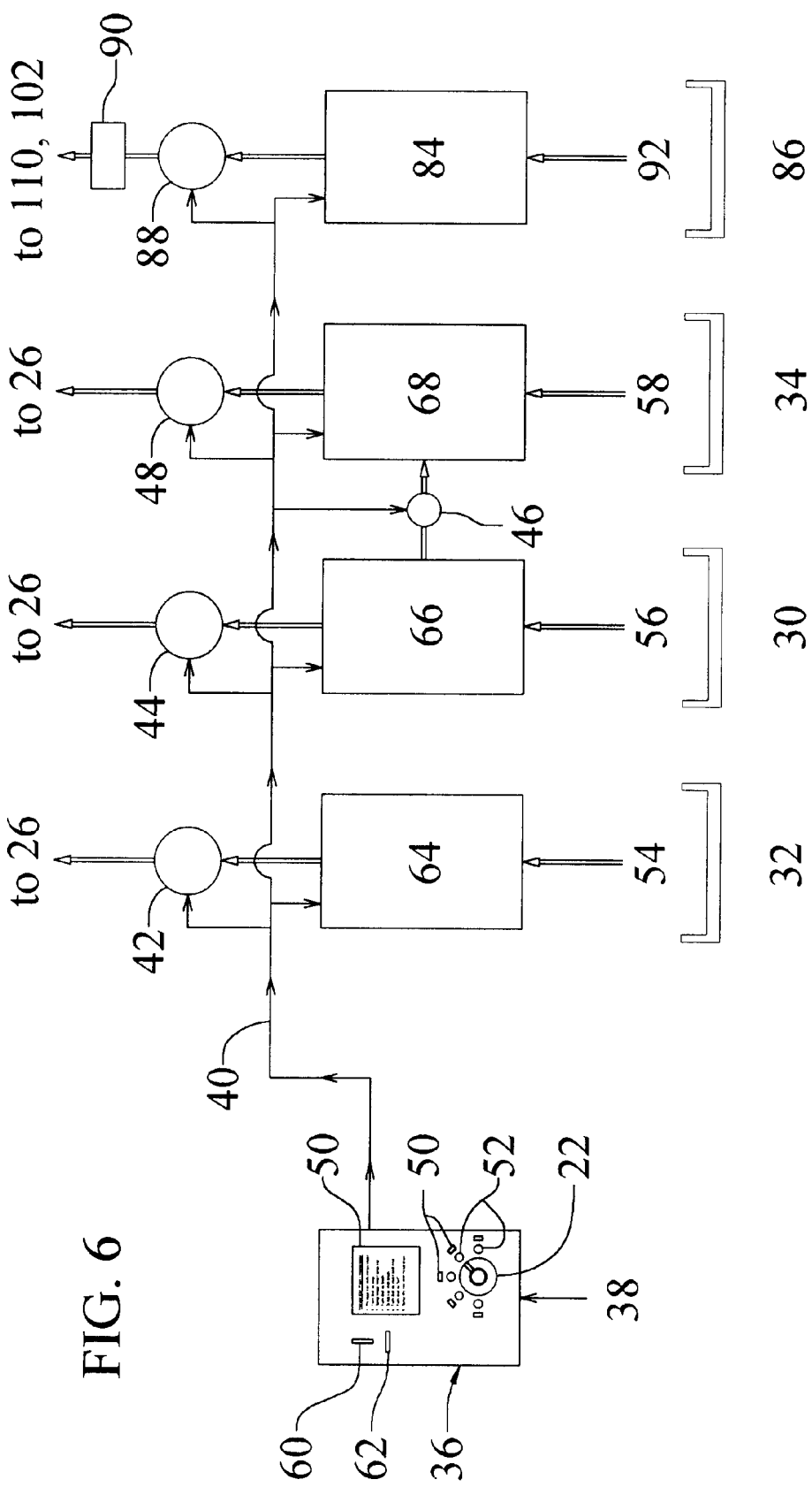
FIG. 6 is a diagrammatic view of the operative interconnection of certain parts of the manual car wash station.

While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

For purposes of illustration, the present invention is shown in the drawings as embodied in the self-service coin-operated manual car wash station 10 (see FIGS. 1–3).

The car wash station 10 comprises a substantially closed car wash bay constructed with side walls 12, front and rear exit doors 14 and 16, respectively, sized for driving the vehicle into and out of the bay, and a ceiling/roof 18. The station preferably includes an equipment room 20 which is generally adjacent or connected to the outside of the building.

The car wash station 10 is equipped with at least one flexible pressure hose 24 (FIG. 5) and an associated spray wand or trigger activated spray nozzle 26 for spraying:

pressurized water for pre-soaking the vehicle prior to cleaning, and for rinsing the vehicle after cleaning;

pressurized soapy water for spray-cleaning the vehicle; and pressurized liquid wax for coating the vehicle after cleaning and rinsing.

Alternately, the clean water, soapy water, and liquid wax are supplied through separate hoses and/or spray nozzles.

A hook 74 connected to the inside wall of the car wash station provides a resting place for the nozzle 26 when not in use, with additional hooks being provided as desired for additional apparatus.

For example, the car wash station 10 may be optionally equipped with a scrub brush 28 (FIG. 4) and associated handle and flexible pressure hose 94 supplying soapy suds for manually scrubbing the vehicle.

To prevent tampering by unauthorized personnel, the soap supply apparatus 34, water supply apparatus 30, and wax supply apparatus 32, and associated flow control apparatus are preferably located in the equipment room 20.

A coin-receiving/coin-operated control box 36 controls timed delivery of the pre-soak/rinse water, the pressurized soapy water, and the liquid wax to the nozzle 26, and delivery of the soapy suds to the brush 28, as selected by the user.

The coin-operated controller 36 is provided with a user operated control selector, shown in the drawings as dial knob 22, adapted for selection of the desired spray through the nozzle 26 or soap to the brush 28, and is operatively connected to such supply apparatus 30, 32, 34 for controlling delivery thereof.

As used herein, it will be understood that "coin-operated" means the controller is adapted to receive coins, bills or other currency, credit cards, debit cards, tokens and the like for time controlled operation of the car wash apparatus.

In the embodiment shown, the selector 22 is a rotary knob with the selection choices being designated by the angularly spaced selection choice indicators 52. Associated labels and/or instructions 50 provide the user with necessary information to quickly and easily place the selector in the appropriate position to obtain the desired spray.

During use, coins are inserted into coin slot 60 (or, for example, a bill or credit card inserted into slot 62), and the controller provides delivery of the selected fluid for the designated time corresponding to the amount of money deposited into or credited to the controller.

The operative connections between the coin-operated control box 36 and the liquid supply and associated control apparatus are generally shown in the schematic of FIG. 6 wherein electrical connections are indicated with single-lines and fluid/pneumatic connections are indicated with double-lines.

In the embodiment shown, the coin-operated controller 36 is provided with electrical power at 38, and the electric power is supplied to a liquid wax supply pump 64, a water supply pump 66, and a soapy water supply pump 68 through electrical line bundle 40.

The coin-operated controller is also electrically connected such as through wire bundle 40 to flow control valves 42, 44, 46 and 48 and associated apparatus to control the associated liquid flow therethrough.

As indicated at 54, 56 and 58, the pumps 64, 66 and 68, respectively, are provided with a continuous supply of wax, water and soap during the selected process.

The output flow of the wax, water and soap are as indicated, flowing to nozzle 26 or brush 28 as selected at the coin-operated timing control box 36.

To accomplish the physical flow connections between the various supply apparatus 30, 32, 34 and the spray nozzle 26 and scrub brush 28, a bundle 70 of flexible hose lines extend from the supply apparatus in the equipment room 20 through a side wall 12, upwardly and then along the ceiling 18 to a swivel ring 72 mounted to the ceiling, and preferable, centrally above the location of the vehicle to be washed when positioned in the bay.

Fluid connection is made between the various hoses in the bundle 70 and the supply hoses 24 and 94 in the swivel ring 72.

The hoses 24 and 94 then hang down from the swivel ring 72 such that the ring swivels to permit the hoses to swing as the operator walks around the car during its cleaning.

Alternately, for example, the hoses may be connected to a swivel arm 76 (FIG. 7) or other suitable connection to permit access of the spray wand or brush around the entire vehicle.

As those skilled in the art will recognize, the embodiment shown in the drawings and described above is intended to be only illustrative in nature of the operative inter-functionality of a self-service manual car wash station provided with coin-operated control for the water, soap and wax, and the specific embodiment shown is not critical to or limiting to the present invention. Those skilled artisans will further recognize that numerous alternate arrangements and control schemes are, have been and will likely be used to achieve the same basic coin-operated control nature of the manual car wash station as generally described above.

In accordance with the present invention, the self-service car wash station 10 is further provided with integrated exit air drying apparatus adapted for spraying drying air flow across the vehicle during coin-operated time controlled operation as the washed vehicle exits the wash bay for relatively fast automatic air drying of the vehicle after its cleaning.

Accordingly, the car wash station 10 is uniquely adapted to permit thorough automatic drying of the car immediately after completion of the washing and waxing thereof to prevent unsightly water spots without the need to towel dry the vehicle.

In carrying out one embodiment of the invention, the exit air drying apparatus 100 is connected to the exit end of the bay, and includes forced air blowers or dryers generally indicated at 102 arranged around the exit 16 of the bay and adapted for spraying through outlets 106 a relatively high-volume of drying forced air over the vehicle as it exits the bay.

The dryers 102 are mounted to a fixed structure such as a wall of the bay or to a frame structure such as generally indicated at 108, and may include provision for initial angular positioning of the dryers and subsequent securing into position on the frame as generally indicated at 104.

The dryers 102 are pneumatically connected together such as with a hose extending along the frame 108, and through a hose 110 to a high-volume flow capacity air supply 86 comprising a blower 84 with an air supply inlet 92 and control valve 88 preferably located in the equipment room 20 to prevent tampering by unauthorized personnel.

The blower 84 and flow control valve 88 are electrically and operatively connected to the coin-operated control box 36, such as through wire bundle 40, and which includes a selector knob 22 position for selection of supplying a flow of drying air to the dryers 102. The control box 36 is operable to initiate and end the availability of both the flow from the liquid supply and the air supply, preferably in a mutually exclusive manner such that the user has only one available at any given time for use in washing, rinsing and drying the vehicle.

The exit air drying apparatus 100 may optionally include a sensing mechanism as indicated at 112 adapted to sense the presence of the vehicle as it approaches and passes through the exit to provide for air flow discharge from the dryers only during the time desired by the user, i.e., providing air flow as the user drives the vehicle from the bay and terminating air flow after the vehicle has exited from the drying apparatus 100.

The air supply apparatus optionally includes a heater such as indicated at 90 to warm the air prior to delivery to the dryers 102.

With this arrangement, the vehicle can be quickly and easily dried after washing by inserting the necessary coins into the control box 36, and/or utilizing the time remaining from an earlier coin deposit, selecting the exit air drying function, and then simply driving the vehicle slowly from the bay whereupon the exit air drying apparatus automatically dries the vehicle.

With the foregoing in mind, those skilled in the art will recognize that the exit drying apparatus 100 shown in the drawings and discussed above is illustrative of one preferred embodiment of the invention, and that alternate exit drying apparatus built-in or integrated into the manual car wash station, i.e., connected to or permanently located at the exit end of the bay and controlled by the coin-operated controller 36, will fall within the scope of the present invention, and that such alternate arrangements will likely be used depending upon the preferences of the designer of the particular car wash station.

By way of non-limiting examples, alternate integrated exit air drying apparatus include alternate exit blower arrangement, such as:

motor driven blowers or dryers adapted to operate independently to the extent that each includes an inlet for air intake, thus obviating the need for a central air supply 86, but requiring electrical connection (or other appropriate operative connection) to the controller 36; and dryer arrangements that are fixed to a frame but positionable and automatically positioned based on the size of the vehicle and/or the position of the vehicle in the exit 16 of the wash bay.

It will also be understood that, where the air supply source (e.g., the blower supply 84) is indicated or required herein for supplying a flow of drying air, an equally suitable arrangement will include the use an air compressor supply source, and exit nozzles in place of the exit dryers for the discharge of pressurized air flow for drying the vehicle as is exits the wash bay.

From the foregoing, it will be clear that the present invention brings to the art new and improved self-service coin-operated manual car wash stations. By virtue of the integrated coin-controlled, automatic exit air drying system, the cleaned vehicle is quickly and easily dried by simply exiting the wash bay, eliminating the prior need to towel dry the vehicle. Moreover, the integrated exit air drying system hereof accomplishes the desired drying capability while preserving the desired simplicity, consistency and unattended ease of operation of prior conventional self-service car wash stations provided with a single integrated coin-operated control system.

We claim:

1. A coin-operated manual car washing station comprising:

a car wash bay having opposing side walls and a ceiling, and having an entrance and exit sized for driving a vehicle therethrough;

a liquid supply and associated manually operable spray nozzle connected thereto for at least one of, pre-soaking the vehicle in the bay, washing the vehicle in the bay, and rinsing the vehicle in the bay after washing;

an air supply and associated dryers positioned for driving the vehicle therethrough and adapted to direct drying air flow inwardly for drying the vehicle with the air flow therefrom as the vehicle exits the bay; and a coin-operated timing control box operative to initiate and end the availability of both the flow from the liquid supply and the air supply in a mutually exclusive manner and in response to selection from the user.

2. The coin-operated manual car washing station of claim 1 in which the dryers are connected to and generally surround the exit of the bay.

3. The coin-operated manual car washing station of claim 1 in which one of said air supply and said dryers include a heater for heating the drying air flow.

4. The coin-operated manual car washing station of claim 1 further comprising means for sensing the presence of a vehicle in the bay as it approaches said exit and automatically activating said air supply as made available by said control box to provide air flow through said dryers to dry the vehicle as it moves through said exit.

5. The coin-operated manual car washing station of claim 4 in which said sensing means including means for automatically deactivating said air supply as the vehicle leaves said exit.

6. A coin-operated manual car washing station comprising:

a permanent car wash bay having opposing side walls and a ceiling, and an entrance and exit sized for driving a vehicle therethrough;

an equipment room adjacent the bay;

a liquid supply located in the equipment room adapted to supply at least one of clean water and soapy water, and an associated spray nozzle located in the bay to enable at least one of pre-soaking the vehicle in the bay prior to washing, washing the vehicle in the bay, and rinsing the vehicle in the bay after washing;

an air supply and associated dryers positioned for driving the vehicle therethrough and adapted to direct drying air flow inwardly for drying the vehicle with the air flow therefrom as the vehicle exits the bay; and a coin-operated timing control box operative to initiate and end the availability of both the flow from the liquid supply and the air supply in a mutually exclusive manner and in response to selection from the user.

7. The coin-operated manual car washing station of claim 6 in which the dryers are connected to and generally surround the exit of the bay.

8. The coin-operated manual car washing station of claim 6 in which one of said air supply and said dryers include a heater for heating the drying air flow.

9. The coin-operated manual car washing station of claim 6 in which the air supply is located in the equipment room.

10. The coin-operated manual car washing station of claim 6 further comprising means for sensing the presence of a vehicle in the bay as it approaches said exit and automatically activating said air supply as made available by said control box to provide air flow through said dryers to dry the vehicle as it moves through said exit.

11. The coin-operated manual car washing station of claim 10 in which said sensing means includes means for automatically deactivating said air supply as the vehicle leaves said exit.

\* \* \* \* \*